United States Patent Office 3,012,060
Patented Dec. 5, 1961

3,012,060
CONVERSION OF HIGHER FATTY ACIDS INTO SHORTER CHAIN LENGTH NITRILES
Robert S. Aries, 77 South St., Stamford, Conn.
No Drawing. Filed Apr. 15, 1958, Ser. No. 728,562
7 Claims. (Cl. 260—465.2)

This invention relates to a novel method for the vapor phase conversion of higher fatty acids to aliphatic compounds of lower molecular weight. More particularly, the invention concerns a novel method for controlled vapor phase oxidation of long chain fatty acids with an oxygen containing gas in the presence of a fatty acid oxidation catalyst and ammonia. This application is a continuation-in-part of my copending application, Serial No. 609,406, filed September 12, 1956, now abandoned.

In accordance with this invention there is provided a novel method of degrading higher fatty acids to produce larger quantities of lower molecular weight degradation products than has been possible by heretofore known degradation techniques. The lower molecular weight aliphatic compounds which are particularly desirable for commercial purposes are those of intermediate chain length, ranging from about 4 to 10 carbon atoms, and include both aliphatic nitriles and acids. Nitriles of this type may be hydrogenated to the corresponding amines which are suitable for all uses for which amines are known to be useful, and which may also serve as cross-linking agents for epoxy resins. Such nitriles may as is well known also be hydroyzed to acids and reacted with an excess of mixed amines, such as those formed by hydrogenation of a mixture of the nitriles, to form amides with excess amino groups. Such amides are also useful as cross-linking agents for epoxy resins.

Numerous methods are known for oxidation of fatty acids with air in the liquid phase. These methods result in comparatively low yields of the desirable range of oxidation products, which initially include aliphatic acids. Thus, even where such acids are subsequently converted to nitriles, the yields of such nitriles must inherently be correspondingly low. When an attempt is made to oxidize long chain fatty acids in the vapor phase using air, the operation becomes uneconomical owing to the extremely low yields obtained of useful material. This problem of low yields arises primarily as the result of the uncontrolled character of the oxidation whereby the intermediate products are further oxidized to carbon dioxide and water.

In accordance with the present invention, higher fatty acids are oxidized in the vapor phase with oxygen or an oxygen-containing gas in the presence of a fatty acid oxidation catalyst and gaseous ammonia. The ammonia serves to control the oxidation by reacting with the intermediate oxidation products to form nitriles and thus stabilizes these intermediate oxidation products at the desirable molecular weight range, protecting them against undesired further oxidation. Thus, the novel process of this invention contemplates simultaneous oxidation and the intermediate formation of nitriles to control the degree of said oxidation. In this way, the new process makes possible the conversion of an inexpensive raw material into the useful range of intermediate degradation products in comparatively high yield.

The raw materials contemplated by the present invention include both saturated and unsaturated long chain fatty acids, and commercial mixtures of such acids. Advantageously such long chain fatty acids will include those in which the chain length ranges from about 12 to about 24 carbon atoms, but the chain length may also be outside this range. As examples of such long chain fatty acids there are mentioned lauric, myristic, palmitic, stearic, oleic, linoleic, linolenic, and ricinoleic acids, and mixtures thereof.

The oxidation in accordance with this invention is carried out in the vapor phase, preferably at temperatures ranging between about 325° C. and 550° C. The oxidizing agent is an oxygen containing gas, such as, for example, air. The molar ratio of oxygen to acid is advantageously at least 2:1, and not in excess of 20:1; preferably the radio is at least 10:1. Molar ratios in excess of 20:1 tend to reduce the yield owing to excessive initial oxidation. Since air contains about 4 moles of nitrogen per mole of oxygen, the amount of air used will be five times that specified for oxygen.

As oxidation catalyst there may be used any of the catalysts conventionally employed for the oxidation of fatty acids. These catalysts include metals and metal oxides and mixtures thereof, either in supported or unsupported form. Examples of fatty acid oxidation catalysts include the following heavy metals and aluminum and their oxides: vanadium, molybdenum, chromium, cobalt, iron, manganese, copper, tin, tungsten, thorium, and uranium. Conveniently, a porous mass such as alumina, silica, or mixtures thereof can be utilized as a support for the fatty acid oxidation catalyst. Vanadium and its oxides are preferred in carrying out the present method, for example, 10% $V_2O_5$ on $Al_2O_3$ in the form of pellets.

The ammonia is employed in gaseous form, in an amount at least three times the molar amount of the fatty acid or acids to be oxidized, but ranging up to about 10 times the molar amount of such acid. Preferably, however, the ammonia will be employed in a ratio of about four moles per mole of acid.

The intermediate reaction products obtained are mixtures of alkane mononitriles and dinitriles having a shorter chain length than the starting fatty acids, with varying minor amounts of carbon dioxide and water. In general these intermediate products range from about 4 to about 10 carbon atoms, and thus may include the alkane nitriles of succinic, adipic, pelargonic, azelaic, pimelic, suberic, and sebacic acids. While the various individual nitriles may be separated from the reaction mixtures in accordance with known methods, such as, for example, fractional distillation, the reaction mixture of nitriles may be used for certain purposes directly without fractionation. As mentioned previously, the mixtures or the individual nitriles may be hydrogenated to amines, or they may be saponified with alkalis, such as sodium hydroxide, to be converted to the corresponding acids, or mixtures of acids. Such hydrolysis of the nitriles may also be conducted with aqueous acids.

The following examples serve to illustrate the novel method of the present invention, but it is not to be considered as limited thereto. Example 1 illustrates the results obtainable by vapor phase oxidation without ammonia.

*Example 1*

5.0 grams per hour of technical oleic acid (assaying 90% oleic acid) are fed into a vaporizing zone maintained at 450° C., and 150 liters per hour of air are also passed through the vaporizing zone. The vapor mixture is passed through a catalyst zone maintained at 450° C. and packed with 40 ml. of 10% $V_2O_5$ on $Al_2O_3$ in the form of ⅛ inch pellets. After a run of four hours, a total of 2.2 grams of maleic anhydride are recovered in the reaction product, equivalent to a yield of 11% by weight, the balance being $CO_2$ and water.

*Example 2*

5.0 grams per hour of technical oleic acid (assaying 90% oleic acid) are fed into a vaporizing zone maintained at 450° C., and 150 liters of air and 30 liters of gaseous ammonia per hour are fed into the vaporizer containing the catalyst charge. The condensed product from an 8 hour run amounts to 21 grams of liquid product after removal of water. The product from a number of runs is combined and 100 grams of combined material is fractionated in a gentle current of nitrogen. When the vapor temperature reaches 226° C., the residue is subjected to distillation in vacuum at 20 mm. absolute pressure while bleeding in a slow current of nitrogen.

The yield of products is given below, and the composition of each fraction is confirmed by its subsequent conversion to the corresponding acid by hydrolysis.

Heptyl cyanide (caprylic acid nitrile), 13 grams, B.P. 198–205° C.
Octyl cyanide (pelargonic acid nitrile), 18 grams, B.P. 218–226° C.
Suberic acid dinitrile, 22 grams, B.P. 175–185° C. (20 mm.)
Azelaic acid dinitrile, 32 grams, B.P. 195–205° C. (20 mm.)

Each nitrile is then separately hydrolyzed by refluxing with 10 times its weight of a 20% solution of potassium hydroxide in 50% aqueous ethanol for 8 hours. In each case, the hydrolyzed product is cooled, neutralized carefully with 20% sulfuric acid, and the ethanol is driven off by heating to 100° C. The product is cooled, and where as in the case of the suberic and azelaic acids, there is a solid present, this is not separated, and the solution or suspension is saturated with common salt, NaCl, and extracted 5 times with 100 ml. portions of ether, the combined ether extracts are filtered, and the ether filtrate evaporated to dryness by warming on the water bath. The yields are as follows:

13 grams heptyl cyanide yield 14 grams of crude caprylic acid, liquid at room temperature. Titration of a weighed sample with standardized NaOH solution gives an equivalent molecular weight of 141.5 (theory for caprylic acid 144.2).

18 grams octyl cyanide yield 18.5 grams of crude pelargonic acid, liquid at room temperature. Titration of a weighed sample with standardized NaOH solution gives an equivalent molecular weight of 152.7 (theory for pelargonic acid 158.2).

22 grams of suberic acid dinitrile yield 23.1 grams of suberic acid, melting point ca. 130° C., raised to 138° C. by one crystallization from a small volume of anhydrous ethanol. Titration of a weighed sample with standardized NaOH solution gives an equivalent weight of 86.5 (theory for suberic acid as a dibasic acid, 87.1).

32 grams of azelaic acid dinitrile yield 32.5 grams of azelaic acid, melting point, ca. 95° C., raised to 102° C. by one crystallization from 400 ml. of boiling water. Titration of a weighed sample with standardized NaOH solution gives an equivalent weight of 92.1 (theory for azelaic acid as a dibasic acid, 94.1).

*Example 3*

100 grams of crude nitriles as obtained by the method of Example 2 are hydrolyzed, without preliminary fractionation, with a liter of 20% potassium hydroxide solution in 50% aqueous ethanol by refluxing for 8 hours. The product is cooled, acidified with 20% sulfuric acid solution, and the ethanol is distilled off. The aqueous solution containing solids in suspension is saturated with common salt, NaCl, and the suspension is extracted with 5 successive portions, each of 200 ml., of ether, the combined ether extracts are evaporated on the water bath to dryness, and then dried in the oven at 100° C. The yield is 91.2 grams of acid, partially solid at room temperature. The total product is distilled at 20 mm. absolute pressure and yields a first fraction of caprylic acid, 14.2 grams, a second fraction of pelargonic acid, 19.1 grams. The appearance of crystals in the condenser indicates the passing over of the dibasic acids, suberic and azelaic. The total yield of mixed suberic and azelaic acids, B.P. 230–245° C. (20 mm.) is 53 grams.

*Example 4*

A sample of heptyl cyanide (10 grams) as obtained in Example 2 on reduction with sodium in ethanol yields the amine, octylamine, which is separated by steam distillation and the liquid is dried with flake caustic soda and dried to yield 7.2 grams, B.P. 180° C. (760 mm.).

*Example 5*

Example 2 is repeated using commercial stearic acid instead of technical oleic acid. The quantities, rates, and conditions are as in Example 2. The yield is 17.4 grams of liquid product free of water. The condensed product from a number of runs is combined, and 100 grams of crude total material is distilled as in Example 2 and yields:

| | Grams |
|---|---|
| Heptyl cyanide | 12.1 |
| Octyl cyanide | 17.0 |
| Suberic acid dinitrile | 21 |
| Azelaic acid dinitrile | 30 |

A larger residue of undistilled material is left than is present in Example 2.

I claim:

1. Method for the conversion of higher fatty acids to alkane nitriles having a shorter chain length than said fatty acids and containing from about 4 to 10 carbon atoms, which comprises oxidizing a higher fatty acid in the vapor phase at a temperature ranging from about 325° to 550° C. with an oxygen containing gas in the presence of a catalyst selected from the group consisting of heavy metals and aluminum and their oxides and mixtures thereof, and gaseous ammonia, the oxygen being present in an amount ranging from about 2 to about 20 times the molar amount of fatty acid, and the ammonia being present in an amount ranging from about 3 to 10 times the molar amount of fatty acid.

2. The method of claim 1 in which the higher fatty acid contains from about 12 to about 24 carbon atoms.

3. The method of claim 1 in which the oxygen is present in an amount ranging from 10 to about 20 times the molar amount of fatty acid.

4. The method of claim 1 in which the ammonia is present in a ratio of about 4 moles per mole of acid.

5. The method of claim 1 in which the catalyst is vanadium oxide.

6. The method of claim 1 in which the higher fatty acid is stearic acid.

7. The method of claim 1 in which the higher fatty acid is oleic acid.

References Cited in the file of this patent

UNITED STATES PATENTS

| | | |
|---|---|---|
| 2,042,729 | Ralston et al. | June 2, 1936 |
| 2,292,950 | Loder et al. | Aug. 11, 1942 |
| 2,299,755 | Jolly | Oct. 27, 1942 |
| 2,662,908 | Logan | Dec. 15, 1953 |
| 2,755,301 | Nelson et al. | July 17, 1956 |

OTHER REFERENCES

Degering, "An Outline of Organic Nitrogen Compounds," 1945, page 508.

Rodd: "Chemistry of Carbon Compounds," 1951, volume 1–A, page 628.